(12) United States Patent
Okazaki et al.

(10) Patent No.: US 10,355,586 B2
(45) Date of Patent: Jul. 16, 2019

(54) POWER CONVERTER

(71) Applicant: CALSONIC KANSEI CORPORATION, Saitama-shi, Saitama (JP)

(72) Inventors: Fumihiro Okazaki, Saitama (JP); Gen Okuzuka, Saitama (JP); Yuuichirou Nomura, Saitama (JP); Masaharu Nagano, Saitama (JP)

(73) Assignee: CALSONIC KANSEI CORPORATION, Saitama-Shi, Saitama (JP)

( * ) Notice: Subject to any disclaimer, the term of this patent is extended or adjusted under 35 U.S.C. 154(b) by 0 days.

(21) Appl. No.: 15/574,079

(22) PCT Filed: May 17, 2016

(86) PCT No.: PCT/JP2016/064565
§ 371 (c)(1),
(2) Date: Nov. 14, 2017

(87) PCT Pub. No.: WO2016/186101
PCT Pub. Date: Nov. 24, 2016

(65) Prior Publication Data
US 2018/0301984 A1    Oct. 18, 2018

(30) Foreign Application Priority Data

May 18, 2015    (JP) .................................. 2015-101047
May 18, 2015    (JP) .................................. 2015-101132

(51) Int. Cl.
*B60L 11/18*    (2006.01)
*H02M 1/44*    (2007.01)
(Continued)

(52) U.S. Cl.
CPC ............... *H02M 1/44* (2013.01); *B60L 50/50* (2019.02); *B60L 53/20* (2019.02); *H02J 7/0052* (2013.01);
(Continued)

(58) Field of Classification Search
CPC . H02M 1/44; H02M 2001/0048; H02P 27/06; B60L 11/18; B60L 11/1801;
(Continued)

(56) References Cited

U.S. PATENT DOCUMENTS 5,994,789 A * 11/1999 Ochiai ................ B60L 11/1803
180/65.1
2003/0029654 A1 * 2/2003 Shimane .................. B60K 6/28
180/65.29
(Continued)

FOREIGN PATENT DOCUMENTS

JP    H09-126617 A    5/1997
JP    2009-201257 A   9/2009
(Continued)

*Primary Examiner* — William Hernandez
(74) *Attorney, Agent, or Firm* — Foley & Lardner LLP

(57) ABSTRACT

A power converter includes: a power module that converts direct-current electric power from a power storage apparatus and alternating-current electrical power to be supplied to a load; a charger that converts alternating-current electrical power supplied via an external connector to direct-current electric power and charges the power storage apparatus therewith; a capacitor module that is arranged between the power module and the charger and that has a capacitor that smoothes voltage; a DC/DC converter that converts direct-current voltage supplied from the power storage apparatus; and a signal line connected to the charger, wherein the power module and the capacitor module are connected by high-voltage wire on one surface side of the capacitor module, and the signal line is connected to the charger by extending
(Continued)

via other surface of the capacitor module opposite from the one surface.

8 Claims, 5 Drawing Sheets

(51) Int. Cl.
    *H02P 27/06*     (2006.01)
    *H02J 7/02*     (2016.01)
    *H02J 7/00*     (2006.01)
    *B60L 50/50*     (2019.01)
    *B60L 53/20*     (2019.01)
    *H02M 7/00*     (2006.01)
    *H02M 1/00*     (2006.01)

(52) U.S. Cl.
    CPC ............ *H02J 7/022* (2013.01); *B60L 2210/40* (2013.01); *H02J 2007/0059* (2013.01); *H02M 7/003* (2013.01); *H02M 2001/0048* (2013.01); *H02P 27/06* (2013.01); *Y02T 10/7005* (2013.01); *Y02T 10/92* (2013.01); *Y02T 90/127* (2013.01)

(58) Field of Classification Search
    CPC .............. B60L 11/1803; B60L 11/1809; B60L 11/1811; B60L 11/1812; B60L 2210/40; Y02T 10/7005; Y02T 10/92; Y02T 90/127
    USPC ......... 327/9.1, 10.1, 19, 20, 43, 71, 82, 151; 363/146; 307/9.1, 10.1, 19, 20, 43, 71, 307/82, 151
    See application file for complete search history.

(56) References Cited

U.S. PATENT DOCUMENTS

| | | | |
|---|---|---|---|
| 2009/0213564 A1 | 8/2009 | Kakuda et al. | |
| 2012/0299377 A1* | 11/2012 | Masuda | B60L 11/005 307/10.1 |
| 2014/0028256 A1* | 1/2014 | Sugiyama | B60L 1/006 320/109 |
| 2018/0334043 A1* | 11/2018 | Zou | B60L 11/1811 |

FOREIGN PATENT DOCUMENTS

| | | |
|---|---|---|
| JP | 2010-259274 A | 11/2010 |
| WO | WO-2013/080665 A1 | 6/2013 |

* cited by examiner

POWER CONVERTER

TECHNICAL FIELD

The present invention relates to a power converter mounted on electric automobiles, hybrid automobiles, and so forth.

BACKGROUND ART

In a power converter mounted on the electric automobiles, hybrid automobiles, and so forth, a motor is driven by converting direct-current electric power from a battery (power storage apparatus) to alternating-current electrical power by an inverter.

Known such a power converter includes those provided with, in order to supply electrical power to a controller and other electrical components, a DC/DC converter that reduces voltage of direct-current electric power from a battery and supplies it to the components (see JP2010-259274A).

SUMMARY OF INVENTION

With the invention described in JP2010-259274A, because high frequency noise is superimposed on an electrical power line due to switching device, etc. in an inverter and a DC/DC converter, there is a risk in that the noise has a negative influence on other signals. Especially, because a voltage level in the signal line of a controller and a sensor is low, the noise may have a negative influence.

An object of the present invention is to provided technical solutions to solve problems due to noise on a signal line.

According to one aspect of the present invention, a power converter for converting electrical power between a power storage apparatus and a load includes: a power module configured to convert direct-current electric power from the power storage apparatus and alternating-current electrical power to be supplied to the load; a charger configured to convert alternating-current electrical power to direct-current electric power, the charger being configured to charge the power storage apparatus therewith, and the alternating-current electrical power being supplied via an external connector; a capacitor module arranged between the power module and the charger, the capacitor module including a capacitor configured to smooth voltage; a DC/DC converter configured to convert direct-current voltage supplied from the power storage apparatus; and a signal line connected to the charger, wherein the power module and the capacitor module are connected by high-voltage wire on one surface side of the capacitor module, and the signal line is connected to the charger by extending via other surface of the capacitor module opposite from the one surface.

According to the above-mentioned aspect of the present invention, because the signal line and the high-voltage wire are separated by a capacitor module, it is possible to prevent the low-voltage wire from being influenced by noise from the high-voltage wire.

DESCRIPTION OF EMBODIMENTS

An embodiment of the present invention will be described below with reference to the drawings.

An overall configuration of a power converter 1 according to the embodiment of the present invention will be described with reference to FIGS. 1 to 3.

Figure 1:
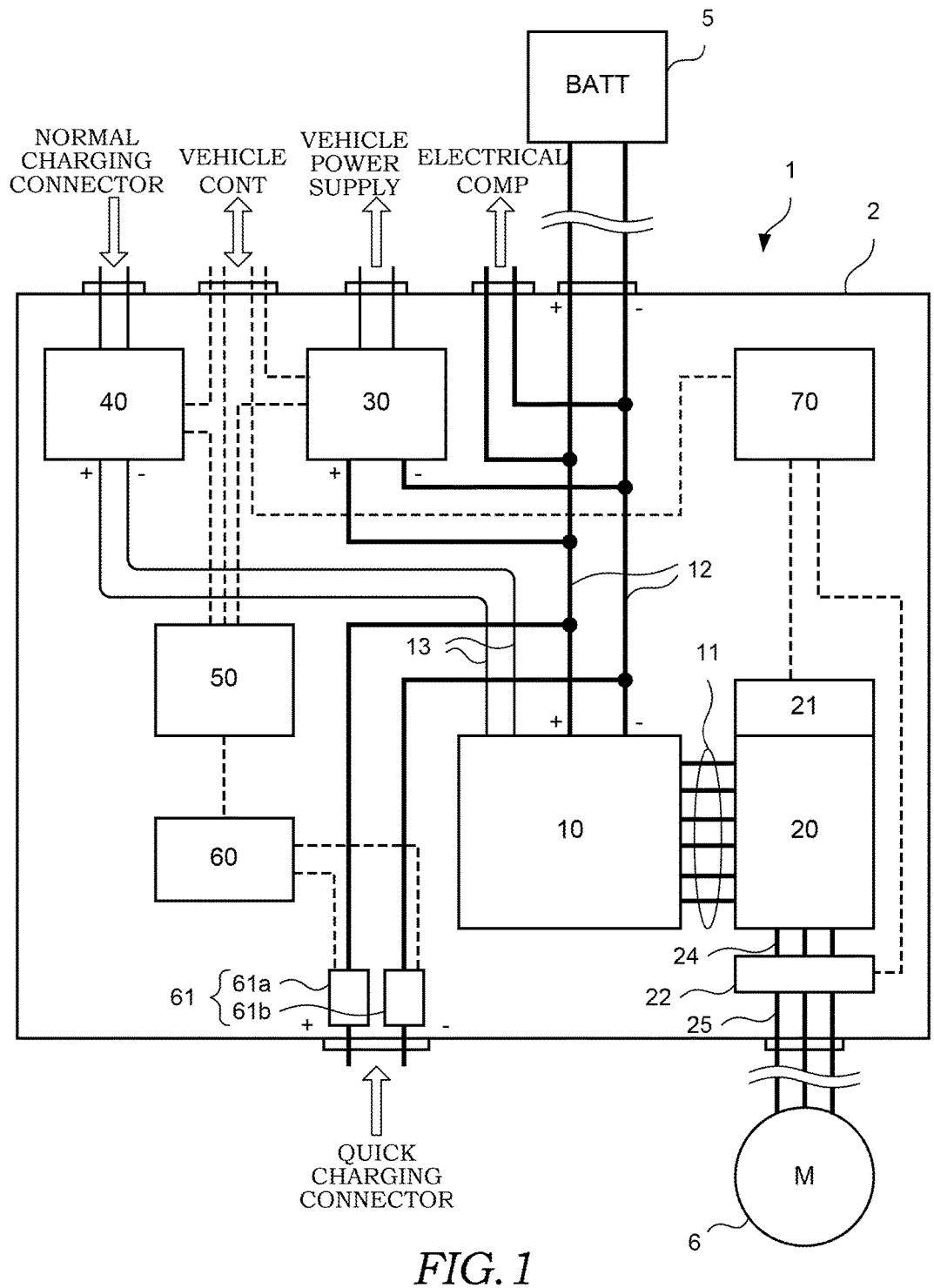
FIG. 1 is a functional block diagram of a power converter according to an embodiment of the present invention.

FIG. 1 is a functional block diagram of the power converter 1.

The power converter 1 is provided in an electric vehicle or a plug-in hybrid electric vehicle, and converts electrical power from a battery (power storage apparatus) 5 to electrical power suitable for driving of a motor generator (dynamo-electric machine) 6 as a load. The motor generator 6 is driven by the electrical power supplied from the power converter 1, and thereby, the vehicle is driven.

The power converter 1 converts regenerative electrical power from the motor generator 6 to direct-current electric power and charges the battery 5 therewith. In addition, the battery 5 is charged by the power converter 1 by supplying electrical power from an external connector provided on a vehicle (not shown) via a quick charging connector 63 or a normal charging connector 81.

The battery 5 is formed of, for example, a lithium ion secondary battery. The battery 5 supplies direct-current electric power to the power converter 1, and battery 5 is charged by direct-current electric power supplied by the power converter 1. The voltage of the battery 5 varies over a range of, for example, from 240 V to 400 V, and the battery 5 is charged by inputting higher voltage than this voltage.

The motor generator 6 is configured as, for example, a permanent magnet synchronous motor. The motor generator 6 is driven by alternating-current electric power supplied by the power converter 1, and thereby, the vehicle is driven. When the vehicle slows down, the motor generator 6 generates regenerative electrical power.

The power converter 1 includes, in a case 2, a capacitor module 10, a power module 20, a DC/DC converter 30, a charger 40, a DC/DC charge controller 50, and an inverter controller 70. Each of these components are connected electrically by bus bars or wires.

The capacitor module 10 is composed of a plurality of capacitor elements (not shown). The capacitor module 10 performs removal of noise and suppression of voltage fluctuation by smoothing the direct-current voltage. The capacitor module 10 includes first bus bars 11, second bus bars 12, and electrical power wires 13.

The first bus bars 11 are connected to the power module 20. The second bus bars 12 are connected to the DC/DC converter 30, relays 61, the battery 5, and an electric compressor (not shown). The electrical power wires 13 are formed of flexible cables, such as, for example, litz wire. The electrical power wires 13 are connected to the charger 40. The first bus bars 11, the second bus bars 12, and the electrical power wires 13 share the positive electrode and the negative electrode in the capacitor module 10.

The power module 20 mutually converts direct-current electric power and alternating-current electric power by turning ON/OFF a plurality of power elements (not shown).

ON/OFF control of the plurality of power elements is performed by a drive substrate 21 provided in the power module 20.

The power module 20 is connected to the first bus bars 11 of the capacitor module 10. The first bus bars 11 are formed of three pairs of bus bars composed of the positive electrodes and the negative electrodes. The power module 20 is provided with three-phase output bus bars (bus bar module) 24 formed of a U-phase, a V-phase, and a W-phase. The output bus bars 24 are connected to a current sensor 22. The current sensor 22 includes motor-side bus bars 25 that output three-phase alternating-current electric power to the motor generator 6 side.

The inverter controller 70 outputs to the drive substrate 21 a signal for operating the power module 20 on the basis of an instruction from a controller (not shown) of the vehicle and detection result of the electric current of the U-phase, the V-phase, and the W-phase from the current sensor 22. The drive substrate 21 controls the power module 20 on the basis of the signal from the inverter controller 70. An inverter module that mutually converts direct-current electric power and alternating-current electric power is formed of the inverter controller 70, the drive substrate 21, the power module 20, and the capacitor module 10.

The DC/DC converter 30 converts voltage of direct-current electric power supplied from the battery 5 and supplies it to other devices. The DC/DC converter 30 steps down voltage of direct-current electric power from the battery 5 (for example, 400 V) to 12 V direct-current electric power. Direct-current electric power voltage of which has been stepped down is supplied as a power supply to a controller, lighting, fan, and so forth mounted on the vehicle. The DC/DC converter 30 is connected to the capacitor module 10 and the battery 5 via the second bus bars 12.

The charger 40 converts commercial power supply (for example, AC 100 to 200 V) that is supplied from an external charging connector provided in the vehicle via a normal charging connector 81 to direct-current electric power (for example, 500 V). Direct-current electric power converted by the charger 40 is supplied from the electrical power wires 13 to the battery 5 via the capacitor module 10. With such a configuration, the battery 5 is charged.

The DC/DC charge controller 50 is provided as a charge controller that controls driving of the motor generator 6 and charging of the battery 5 by the power converter 1. Specifically, on the basis of the instruction from the controller of the vehicle, the DC/DC charge controller 50 controls the charging of the battery 5 by the charger 40 via the normal charging connector 81, charging of the battery 5 via a quick charging connector 63, the driving of the motor generator 6, and the lowering of voltage by the DC/DC converter 30.

A relay controller 60 controls on/off of the relays 61 by the control performed by the DC/DC charge controller 50. The relays 61 are composed of a positive-side relay 61a and a negative-side relay 61b. The relays 61 allows conduction of electricity when connection at the external charging connector is established via the quick charging connector 63 and supplies direct-current electric power (for example 500 V) supplied from the quick charging connector to the second bus bars 12. The battery 5 is charged by direct-current electric power thus supplied.

Figure 2:
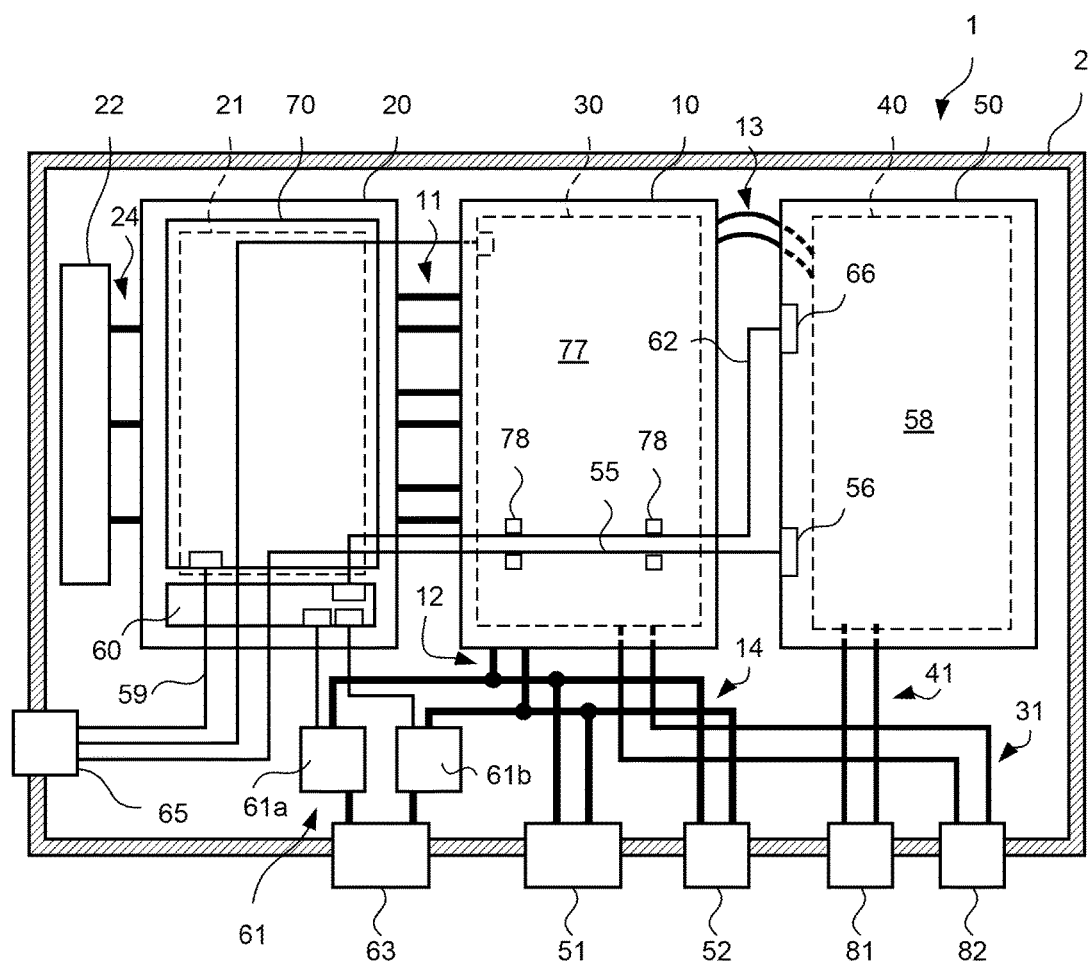
FIG. 2 is a structural block diagram of the power converter according to the embodiment of the present invention.
Figure 3:
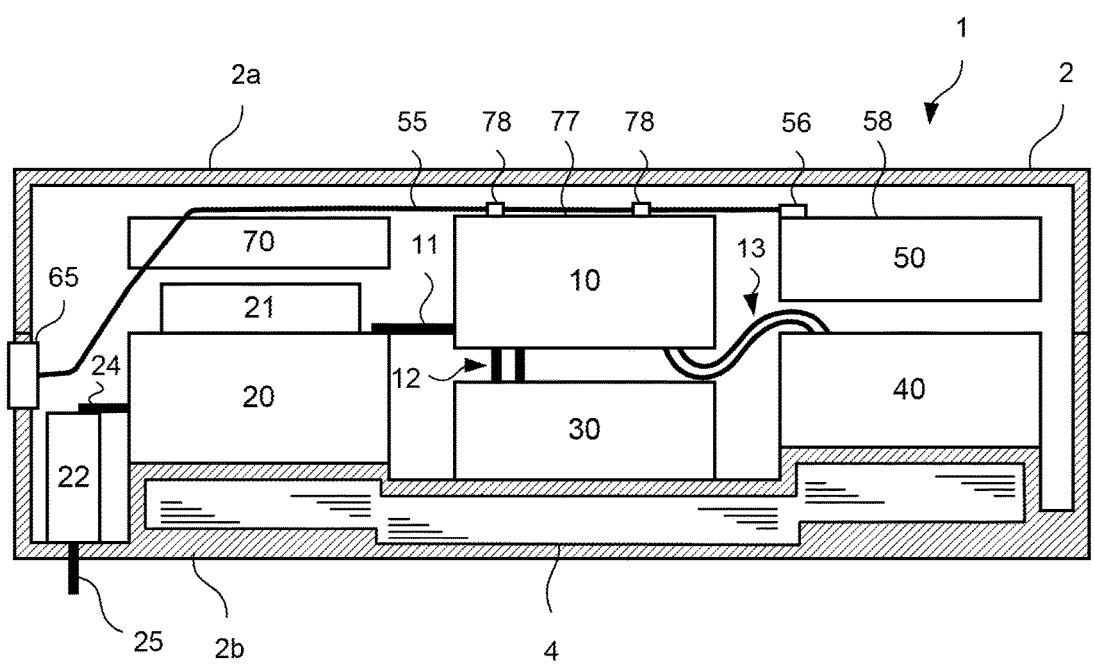
FIG. 3 is a structural block diagram of the power converter according to the embodiment of the present invention.

FIGS. 2 and 3 are structural block diagrams of the power converter 1 according to this embodiment. FIG. 2 is a top view of the power converter 1, and FIG. 3 is a side view of the power converter 1.

In the case 2, the power module 20, the DC/DC converter 30, and the charger 40 are arranged around the capacitor module 10.

Specifically, in the case 2, the capacitor module 10 is arranged between the power module 20 and the charger 40. The capacitor module 10 is layered over the DC/DC converter 30, and the DC/DC converter 30 is arranged below the capacitor module 10. The charger 40 is layered over the DC/DC charge controller 50, and the charger 40 is arranged below the DC/DC charge controller 50.

The first bus bars 11 project out from one side surface of the capacitor module 10. The first bus bars 11 are directly connected to the power module 20 by using screws, etc. From the power module 20, three-phase output bus bars 24 that consist of the U-phase, the V-phase, and the W-phase project out at the opposite side from the first bus bars 11.

The output bus bars 24 are directly connected to the current sensor 22 by using screws, etc. The motor-side bus bars 25 project out from the bottom side of the current sensor 22 (see FIG. 3). The motor-side bus bars 25 are respectively connected to the U-phase, the V-phase, and the W-phase of the output bus bars 24 of the power module 20 directly, and output three-phase alternating-current electric power. The motor-side bus bars 25 are formed so as to be exposed from the case 2 and are connected to the motor generator 6 by a harness, etc.

The drive substrate 21 is layered on a top surface of the power module 20. The inverter controller 70 and the relay controller 60 are arranged so as to be layered above the drive substrate 21.

The second bus bars 12 project out from the bottom surface side of the capacitor module 10. The second bus bars 12 are connected, by using screws, directly to the DC/DC converter 30 that is arranged so as to be layered below the capacitor module 10. The second bus bars 12 are connected to the positive-side relay 61a and the negative-side relay 61b (see FIG. 1).

The second bus bars 12 are respectively connected via bus bars 14 to a battery-side connector 51 to which the battery 5 is connected and a compressor-side connector 52 to which an electric compressor is connected.

The DC/DC converter 30 is connected to a vehicle-side connector 82 via bus bars 31. The vehicle-side connector 82 is connected to harnesses, etc. for supplying direct-current power supply output from the DC/DC converter 30 to respective parts of the vehicle.

The electrical power wires 13 project out from the side of the capacitor module 10 opposite from the first bus bars 11. The electrical power wires 13 are flexible cables having bendability and are connected to the charger 40. The charger 40 are connected to the normal charging connector 81 via bus bars 41.

A signal line connector 65 allows connection between the outside of the case 2 and signal lines 55 and 59, etc. (see FIG. 2) connected to the DC/DC converter 30, the charger 40, the DC/DC charge controller 50, and the inverter controller 70 of the power converter 1. A vehicle controller (not shown) is provided at the outside of the case 2, and the signal lines 55 and 59 are connected to the vehicle controller via the signal line connector 65. The vehicle controller is operated by electrical power from auxiliary battery (the voltage is lower than that of the battery 5 as a driving power supply, and is, for example, 12V.), and low voltage signals flow also through the signal lines 55 and 59.

The signal line 55 is connected from the signal line connector 65 to the DC/DC charge controller 50. The signal line 55 is connected to a connector 56 of the DC/DC charge controller 50 by extending through a space between a top surface of the capacitor module 10 and the case 2 and by being packed together with a signal line 62 extending from the DC/DC charge controller 50 to the relay controller 60. A guide surface 77 for guiding the signal line 55 and the signal line 62 is formed on the top surface of the capacitor module 10, and guide parts 78 for supporting the signal line 55 and the signal line 62 are formed thereon.

The case 2 is formed of an upper case 2a and a bottom case 2b. A coolant-water flow channel 4 is formed in the bottom case 2b. The coolant-water flow channel 4 is configured such that coolant water (cooling medium) flows through pipes 96 and 97 (see FIG. 5) as indicated by arrows. The power module 20, the DC/DC converter 30, and the charger 40 that are mounted directly above the coolant-water flow channel 4 are cooled by the coolant water in this order.

In the power converter 1 thus configured, the power module 20, the DC/DC converter 30, and the charger 40 are arranged so as to be adjacent to the capacitor module 10, and the respective components are connected to the capacitor module 10 by the first bus bars 11, the second bus bars 12, and the electrical power wires 13. Thus, the distances between the capacitor module 10 and each of the power module 20, the DC/DC converter 30, and the charger 40 can be made shorter. With such a configuration, it is possible to reduce resistance (R) and inductance (L) on paths of direct-current electric power and to reduce electrical power loss.

Furthermore, because the capacitor module 10 is arranged between the power module 20 and the charger 40 that generate large amount of heat, it is possible to suppress mutual influence by the heat between the power module 20 and the charger 40. Especially, operation of the power module 20 (power running and regeneration of the motor generator 6) and operation of the charger 40 (charging of the battery 5 by the normal charging connector 81) are not performed at the same time. Thus, it is possible to eliminate influence by the heat between the power module 20 and the charger 40.

Next, the configuration of the capacitor module 10 will be described with reference to FIG. 4.

Figure 4:
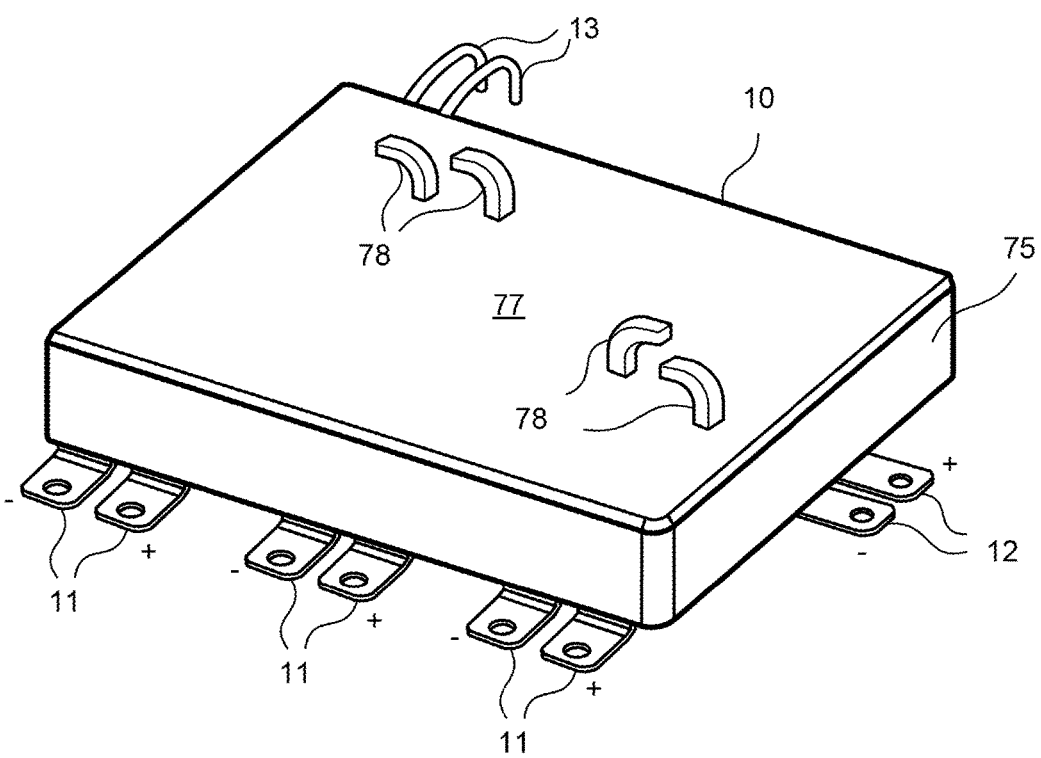
FIG. 4 is a perspective view of a capacitor module of the power converter according to the embodiment of the present invention.

FIG. 4 is a perspective view of the capacitor module 10 according to this embodiment.

With the capacitor module 10, the plurality of capacitor elements (not shown) are accommodated in a capacitor case 75. In the capacitor module 10, a plurality of capacitors are electrically connected by an internal bus bar (not shown) composed of the positive electrode and the negative electrode. The capacitor elements and the internal bus bar are molded into resin material.

A plurality of guide parts 78 are formed on the guide surface 77 on the top surface of the capacitor module 10. The guide parts 78 have a claw-like shape. The plurality of guide parts 78 are formed so as to face each other. The signal line 55 and the signal line 62 are fixed between the facing guide parts 78. With such a configuration, alignment of the signal line 55 and the signal line 62 is achieved, and movement of the signal line 55 and the signal line 62 by vibrations, impacts, and so forth is prevented.

The internal bus bar is branched to each of the first bus bars 11, the second bus bars 12, and the electrical power wires 13.

The first bus bars 11 are formed of the bus bars composed of three pairs of positive electrodes and negative electrodes corresponding to three phases of the power module 20, including the U-phase, the V-phase, and the W-phase. The first bus bars 11 are provided so as to project out from a bottom surface of the capacitor case 75 towards the one side surface.

The second bus bars 12 are formed of the bus bars forming a pair of positive electrodes and negative electrodes. The second bus bars 12 are provided so as to project out from the bottom surface of the capacitor case 75 towards a second side surface adjacent to the above-mentioned one side surface. The electrical power wires 13 consist of flexible cables with a positive electrode and a negative electrode. The electrical power wires 13 are provided so as to extend towards the bottom surface side of the capacitor case 75.

In a state in which the first bus bars 11 are installed in the case 2, the first bus bars 11 have shapes so as to be in contact with terminals corresponding to three phases, including the U-phase, the V-phase, and the W-phase, provided in the power module 20 positioned at the one side surface side of the capacitor module 10. The first bus bars 11 are connected to the terminals by using screws, etc. so as to be in contact with the terminals of the power module 20.

In a state in which the second bus bars 12 are installed in the case 2, the second bus bars 12 have shapes so as to be in contact with terminals provided in the DC/DC converter 30 positioned at the bottom surface side of the capacitor module 10. The second bus bars 12 are connected to the terminals by using screws, etc. so as to be in contact with the terminals of the DC/DC converter 30. The bus bars 14 are connected to the terminals of the DC/DC converter 30. The bus bars 14 are respectively connected to the relays 61, the battery-side connector 51, and the compressor-side connector 52.

In a state in which the electrical power wires 13 are installed in the case 2, the electrical power wires 13 are connected to terminals provided in the charger 40 positioned on the side surface side of the capacitor module 10 that is opposite from the one side surface thereof. Because the electrical power wires 13 have flexibility, the electrical power wires 13 are connected to the terminals of the charger 40 such that there is no interference with the DC/DC charge controller 50 arranged above the charger 40, and with other components and structures provided in the case 2.

As described above, the power converter 1 that performs conversion and supply of electrical power between the battery 5 and the motor generator 6 includes: the power module 20 that converts direct-current electric power from the battery 5 and alternating-current electrical power to be supplied to the motor generator 6; the charger 40 that charges the battery 5 with electrical power supplied via the external connector (the normal charging connector 81); the capacitor module 10 that has a capacitor that smoothes voltage; and the power module 20. Heavy-current wires connecting the power module 20 and the capacitor module 10 are arranged on the one surface side (the lower side in FIG. 3) of the capacitor module 10, and low-voltage wires (the signal line 62) that transmit control signal for the charger 40 are arranged on the other surface (a top surface in FIG. 3) side of the capacitor module 10 that is opposite from the one surface thereof.

With such a configuration, high-voltage wires (the first bus bars 11, the second bus bars 12, and the electrical power wires 13) through which high-voltage electrical power flows are arranged on the lower side of the capacitor module 10, and low-voltage wires (the signal line 55 and the signal line 62) through which low-voltage (light-current) signals, such as control instruction, acquisition signal of a sensor, and so forth, flows are arranged on the top surface of the capacitor module 10. Thus, because the capacitor module 10 is arranged between the low-voltage wires and the high-voltage wires, a sufficient separation distance is secured between the high-voltage wires and the low-voltage wires, and therefore, it is possible to prevent the low-voltage wires from being influenced by superimposed noise on the high-voltage wires due to ON/OFF of a switching device of the power module 20.

In addition, the power converter 1 further includes the DC/DC converter 30 that converts direct-current voltage supplied from the battery 5, and the power converter 1 is configured such that the DC/DC converter 30 is arranged below the capacitor module 10.

With such a configuration, it is possible to prevent the low-voltage wires from being influenced by superimposed noise on the high-voltage wires between the capacitor module 10 and the DC/DC converter 30.

In addition, the power converter 1 is configured such that the capacitor module 10 is arranged between the power module 20 and the charger 40 in the case 2 and arranged so as to be layered with the DC/DC converter 30, and such that the signal lines 55 and 62 are connected to the charger 40 by extending via the top surface of the capacitor module 10.

With such a configuration, it is possible to prevent the signal lines 55 and 62 from being influenced by superimposed noise on the high-voltage wires by arranging the capacitor module 10 between the signal lines 55 and 62 and the high-voltage wires, and furthermore, it is possible to reduce the size of the power converter 1 because the distances between the capacitor module 10 and each of the power module 20, the DC/DC converter 30, and the charger 40 can be made shorter in the case 2.

In addition, in the power converter 1 of the embodiment of the present invention, because, the guide parts 78 for supporting the signal lines 55 and 62 are provided on the guide surface 77 of the top surface of the capacitor module 10, movement of the signal lines 55 and 62 by vibrations, impacts, and so forth is prevented.

Next, the configurations of the signal line 55 and the signal line 62 will be described with reference to FIG. 5.

Figure 5:
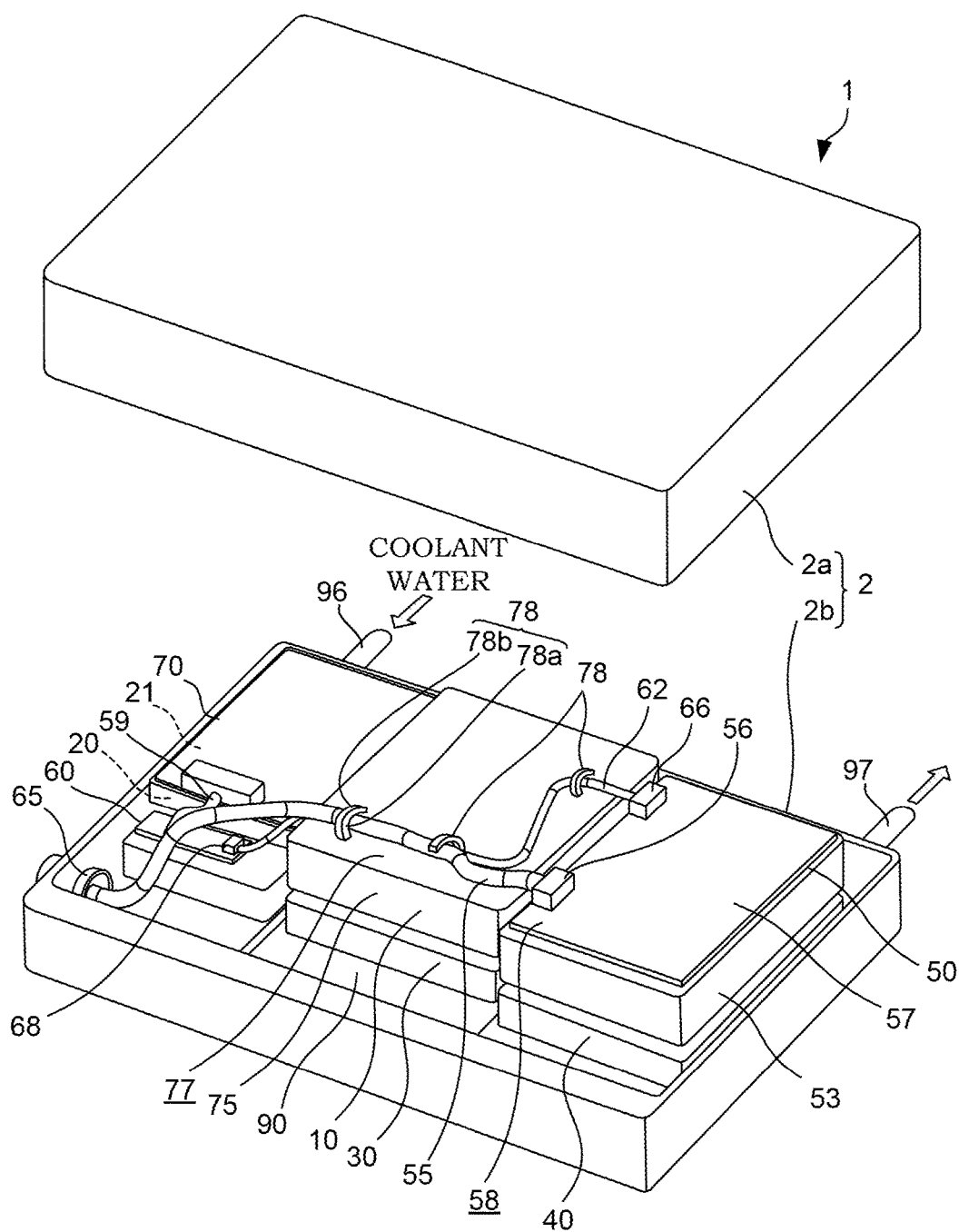
FIG. 5 is a perspective view showing a state in which a case of the power converter according to the embodiment of the present invention is opened.

FIG. 5 is a perspective view of the power converter 1 showing a state before the upper case 2a is assembled to the bottom case 2b. In order to simplify the description, a part of the power converter 1 is omitted in FIG. 5.

In the bottom case 2b, a base (chassis) 53 is attached above the charger 40. A DC/DC board 57 forming the DC/DC charge controller 50 is attached on the base 53. With the base 53, the DC/DC charge controller 50 is supported relative to the bottom case 2b.

The connector 56 to which the signal line 55 is connected and a connector 66 to which the signal line 62 is connected are attached on the DC/DC board 57. The connectors 56 and 66 are provided so as to project upwards from the DC/DC board 57. The connectors 56 and 66 are arranged such that openings, into which the signal lines 55 and 62 are plugged, respectively face upwards of the capacitor module 10.

The signal lines 55 and 62 are formed of flexible cables. The guide surface 77 on which the signal lines 55 and 62 are disposed is provided on the capacitor module 10.

The capacitor module 10 is provided with the capacitor case 75 attached to the bottom case 2b. The guide surface 77 is formed on a top surface of the capacitor case 75. The plurality of capacitor elements (not shown) forming the capacitor module 10 are provided in the capacitor case 75. The DC/DC converter 30 is provided below the capacitor module 10.

The guide surface 77 of the capacitor case 75 is formed so as to extend in the extending direction of the DC/DC board 57. The guide surface 77 and a top surface 58 of the DC/DC board 57 are provided so as to be arranged side-by-side to each other on the same plane (flash to each other). This positional relationship is achieved by arbitrary setting the height of the base 53 relative to a bottom wall 90 of the bottom case 2b.

The capacitor case 75 is formed with the plurality of guide parts 78 that guide the signal lines 55 and 62 in the direction into which they are plugged into the connectors 56 and 66. The guide parts 78 are respectively arranged so as to be aligned along the signal lines 55 and 62 plugged into the connectors 56 and 66.

The guide parts 78 each has a projected portion 78a that projects out from the guide surface 77 and a hook-shaped extended portion 78b that is bent from the projected portion 78a and extended over the guide surface 77. Spaces for guiding the signal lines 55 and 62 plugged into the connectors 56 and 66 are respectively formed between the guide surface 77 and the guide parts 78.

When the power converter 1 is assembled, the signal line 55 extending from the signal line connector 65 attached to the bottom case 2b is plugged into the connector 56 through a space between the capacitor module 10 and the upper case 2a. The signal line 62 extending from a connector 68 provided on the relay controller 60 is plugged into the connector 66 through the space between the capacitor module 10 and the upper case 2a. At this time, the guide surface 77 extend in the extending direction of the DC/DC board 57 to which the connectors 56 and 66 are attached and is arranged side-by-side with the top surface 58 of the DC/DC board 57 on the same plane. Thus, the signal lines 55 and 62 are guided by the guide surface 77 and each of the guide parts 78 and plugged into the connectors 56 and 66. As described above, an assembly work of the signal lines 55 and 62 is performed smoothly.

The signal lines 55 and 62 plugged into the connectors 56 and 66, respectively, are supported by the guide surface 77 and each of the guide parts 78 provided on the capacitor module 10. Because the signal lines 55 and 62 are provided on the guide surface 77 extending in the direction in which the connectors 56 and 66 are plugged, it is possible to suppress movement of the signal lines 55 and 62 in the case 2 by vibrations, impacts, and so forth received from the vehicle. With such a configuration, a connected state of the signal lines 55 and 62 to the connectors 56 and 66 is maintained, and sending/receiving by the DC/DC charge controller 50 is performed stably.

Because the capacitor module 10 is arranged between the signal lines 55 and 62 and the DC/DC converter 30, a required distance from the DC/DC converter 30, the first bus bars 11, the second bus bars 12, and so forth as a noise source can be secured. In the capacitor module 10, conductive materials of the capacitor provide a shielding function against the noise. With such a configuration, the noise generated by the DC/DC converter 30, the first bus bars 11, the second bus bars 12, and so forth arranged below the capacitor module 10 in the case 2 is suppressed by the capacitor module 10 from being input to the signal lines 55 and 62.

As described above, because influence by the noise and impacts is suppressed in the power converter 1, and the DC/DC charge controller 50 and the capacitor module 10 are arranged side-by-side, the reduction of the size of the power converter is made possible.

Embodiments of this invention were described above, but the above embodiments are merely examples of applications of this invention, and the technical scope of this invention is not limited to the specific constitutions of the above embodiments.

For example, in the embodiment mentioned above, although the capacitor module 10 is connected to the charger 40 by using flexible cables (the electrical power wires 13), the configuration is not limited thereto. The capacitor module 10 may be connected to the charger 40 by bus bars, or the capacitor module 10 may be connected to the power module 20 or the DC/DC converter 30 by flexible cables.

This application claims priority based on Japanese Patent Application No. 2015-101047 filed with the Japan Patent Office on May 18, 2015 and Japanese Patent Application No. 2015-101132 filed with the Japan Patent Office on May 18, 2015, the entire contents of which are incorporated into this specification.

The invention claimed is:

1. A power converter for converting electrical power between a power storage apparatus and a load, comprising:
   a power module configured to convert direct-current electric power from the power storage apparatus to alternating-current electrical power to be supplied to the load;
   a charger configured to convert external alternating-current electrical power to direct-current electric power, the charger being configured to charge the power storage apparatus therewith, and the external alternating-current electrical power being supplied via an external connector;
   a capacitor module arranged between the power module and the charger, the capacitor module including a capacitor configured to smooth voltage;
   a DC/DC converter configured to convert direct-current voltage supplied from the power storage apparatus; and
   a signal line connected to the charger, wherein
      the power module and the capacitor module are connected by high-voltage wire on one surface side of the capacitor module, and
      the signal line is connected to the charger by extending via another surface of the capacitor module opposite from the one surface.

2. The power converter according to claim 1, further comprising
   a case configured to accommodate the power module, the charger, the capacitor module, and the DC/DC converter, wherein
   the capacitor module is arranged below the DC/DC converter in the case so as to be layered, and
   the signal line is connected to the charger by extending via a top surface of the capacitor module.

3. The power converter according to claim 2, wherein
   a guide part is provided on the top surface of the capacitor module, the guide part being configured to support the signal line.

4. The power converter according to claim 1, further comprising:
   a charge controller configured to control charging of the power storage apparatus by electrical power supplied from outside; and
   a case configured to accommodate the power module, the charger, the charge controller, and the capacitor module, wherein
   the signal line is connected to the charge controller via a connector through a space between the capacitor module and the case, and
   the capacitor module includes a guide surface on which the signal line is mounted, the guide surface being configured to extend in a direction in which the signal line is plugged into the connector.

5. The power converter according to claim 4, wherein
   the connector is provided so as to project out from a board of the charge controller, and
   the guide surface is configured to extend in an extending direction of the board.

6. The power converter according to claim 5, wherein the guide surface is arranged side-by-side with a top surface of the board in a same plane.

7. The power converter according to claim 4, further comprising
   a guide part projected from the guide surface, the guide part being configured to guide the signal line in a direction in which the signal line is plugged into the connector.

8. The power converter according to claim 4, wherein
   the capacitor module is arranged between the signal line and the DC/DC converter.

* * * * *